United States Patent
Sigwart et al.

(10) Patent No.: US 6,384,154 B1
(45) Date of Patent: May 7, 2002

(54) PREPARATION OF HALOGEN-FREE, REACTIVE POLYISOBUTENE

(75) Inventors: Christoph Sigwart, Schriesheim; Thomas Narbeshuber, Ludwigshafen; Eugen Gehrer, Rankweil; Rolf Fischer, Heidelberg; Ulrich Steinbrenner; Shelue Liang, both of Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/744,256

(22) PCT Filed: Jul. 15, 1999

(86) PCT No.: PCT/EP99/05013

§ 371 Date: Jan. 31, 2001

§ 102(e) Date: Jan. 31, 2001

(87) PCT Pub. No.: WO00/08075

PCT Pub. Date: Feb. 17, 2000

(30) Foreign Application Priority Data

Jul. 31, 1998 (DE) .......................................... 198 34 593

(51) Int. Cl.[7] .......................... C08F 110/10; C08F 4/06; C08F 4/26

(52) U.S. Cl. ........................ 526/68; 526/88; 526/96; 526/101; 526/103; 526/104; 526/107; 526/113; 526/172; 526/290; 526/348.7; 585/526; 585/530; 585/531

(58) Field of Search ......................... 526/68, 88, 102, 526/103, 104, 106, 107, 172, 96, 101, 113, 290, 348.7; 585/526, 530, 531

(56) References Cited

U.S. PATENT DOCUMENTS

| | | |
|---|---|---|
| 4,152,499 A | 5/1979 | Boerzel et al. |
| 4,288,649 A | 9/1981 | McCaulay |
| 4,832,702 A | 5/1989 | Kummer et al. |
| 5,326,920 A | 7/1994 | Ho et al. |
| 5,663,470 A | 9/1997 | Chen et al. |
| 5,710,225 A * | 1/1998 | Johnson et al. ............. 526/172 |
| 5,945,575 A * | 8/1999 | Sigwart et al. ......... 526/107 X |

FOREIGN PATENT DOCUMENTS

| | | |
|---|---|---|
| DE | 27 02 604 | 7/1978 |
| DE | 195 20 078 | 12/1996 |
| DE | 195 28 942 | 2/1997 |
| DE | 197 04 482 | 8/1998 |
| DE | 197 34 176 | 2/1999 |
| EP | 0 145 235 | 6/1985 |
| EP | 0 244 616 | 11/1987 |
| EP | 0 825 205 | 2/1998 |
| JP | 56-139429 | 10/1981 |
| WO | WO 94/28036 | 12/1994 |
| WO | WO 95/26814 | 10/1995 |
| WO | WO 95/26815 | 10/1995 |
| WO | WO 95/26816 | 10/1995 |
| WO | WO 95/26818 | 10/1995 |

OTHER PUBLICATIONS

H. Güterbock, Chemische Technologie der Kunstoffe, pp. 77–104, "Herstellung Hochmolekularer polyisobutene," 1959.

* cited by examiner

Primary Examiner—Fred Teskin
(74) Attorney, Agent, or Firm—Oblon, Spivak, McClelland, Maier & Neustadt, P.C.

(57) ABSTRACT

A process for preparing halogen-free, reactive polyisobutene having a terminal double bond content of more than 60 mol % and an average molecular weight $M_n$ of 800–3000 dalton by cationic polymerization in the liquid phase of isobutene over an acidic, essentially halogen-free heterogeneous catalyst, where a) a hydrocarbon mixture of essentially $C_4$-hydrocarbons comprising isobutene in an amount of from 10 to 80% by weight is used as the starting material and b) polymerization is carried out continuously at from −30 to 0° C. with average starting material residence times of one hour or less, where the temperature and the residence time are selected such that the isobutene conversion is less than 60% and, after separation from the resulting polyisobutene, the isobutene is either enriched in the partially converted hydrocarbon mixture and returned to the polymerization or passed to another isobutene reaction coupled with the polymerization.

10 Claims, No Drawings

PREPARATION OF HALOGEN-FREE, REACTIVE POLYISOBUTENE

The present invention relates to an improved process for preparing halogen-free, reactive polyisobutene having a terminal double bond content of more than 60 mol % and an average molecular weight $M_n$ of 800–3000 dalton by cationic polymerization in the liquid phase of isobutene over an acidic, essentially halogen-free heterogeneous catalyst, the increased terminal double bond content being obtained by partial conversion.

The polymerization of isobutene yields an inseparable mixture of polyisobutenes, in which the position of the double bond varies between the individual polyisobutenes. Polyisobutenes of formula I

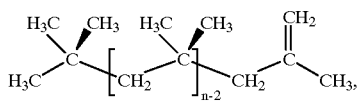

where n is the degree of polymerization which in turn is derived from the average molecular weight $M_n$ of the polyisobutene prepared, contain terminal C—C double bonds of the vinylidene type which are herein also referred to as α-olefinic double bonds owing to their position in the polyisobutene molecule. Accordingly, the double bonds in polyisobutenes of the formula II

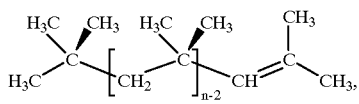

are referred to as β-olefinic. If the polymerization of isobutene is carried out without taking special measures, a random mixture is formed which comprises polyisobutenes having α-olefinic, i.e. terminal, double bonds, β-olefinic double bonds and double bonds located further toward the interior of the polyisobutene molecule. Both the terminal double bond content and the β-olefinic double bond content of a polyisobutene product prepared by a particular process are both reported in mol %.

The preparation of polyisobutenes is described, for example, in H. Güterbock, Polyisobutylene und Mischpolymerisate, p. 77–104, Springer-Verlag, Berlin, 1959. They are usually prepared by Lewis-acid-catalyzed isobutene polymerization employing aluminum chloride, alkylaluminum chloride or boron trifluoride as Lewis acids. However, the resulting polymers have a relatively low vinylidene-type terminal C—C double bond content of less than 10 mol %.

In contrast, reactive polyisobutene (PIB) having molecular weights of usually 500–5000 dalton has a high terminal vinylidene group content of, preferably, more than 50 mol %. These reactive polyisobutenes are used as intermediates in the preparation of additives for lubricants and fuels as described, for example, in DE-A 27 02 604. These additives are prepared by initially reacting polyisobutene with maleic anhydride. The preferred reactive sites for this reaction are terminal double bonds of the vinylidene type, whereas double bonds located further toward the interior of the macromolecule react to a lesser extent, if at all, depending on their position in the molecule. The polyisobutene/maleic anhydride adducts formed are then reacted with certain amines to give the corresponding additives. It is therefore absolutely necessary for polyisobutenes used as starting materials for the abovementioned additives to have a high terminal double bond content. The same applies to the preparation of the polyisobuteneamines of EP-A 244 616 which are also used as fuel additives and which are prepared by hydroformylation of the reactive polyisobutene and subsequent reductive amination of the resulting polyisobutene aldehyde. For this process, preference is likewise given to using polyisobutene having a high terminal double bond content, but β-olefinc polyisobutenes also give the desired product when the hydroformylation is carried out using cobalt catalysts, owing to their double bond isomerization activity.

Most prior art methods for the preparation of reactive polyisobutene involve the homogeneously catalytic polymerization of isobutene. According to DE-A 27 02 604, for example, a polyisobutene product having a terminal double bond content of up to 88% is obtained by reacting isobutene in the presence of boron trifluoride. EP-A 145 235 teaches the polymerization of isobutene in the presence of a complex of boron trifluoride and a primary alcohol at from –100° C. to +50° C. to give products having similarly high vinylidene double bond contents. According to U.S. Pat. No. 5,286,823, highly reactive polyisobutene can also be prepared using complexes of boron trifluoride and secondary alcohols as catalyst.

The disadvantages of this homogeneously catalyzed process are that the Lewis acid catalysts used are corrosive and that there is a risk that, in addition to the desired reactive polyisobutene, halogenated polymeric byproducts are formed which are virtually inseparable from PIB and adversely affect the product and further processing characteristics of the PIB. In these processes, the homogeneous catalyst is usually separated off by quenching with a nucleophile to destroy the catalyst and subsequently removing the PIB from the quenching mixture by extraction. These additional work-up steps are a further disadvantage of the homogeneously catalyzed process.

Furthermore, WO 94/28036 discloses the preparation of polyisobutene using heterogeneous Lewis acid-like catalysts. Catalysts used are salts of elements of transition groups III, IV, V and VI of the Periodic Table of the Elements which are insoluble in the reaction medium, preferably halides, sulfates, perchlorates, trifluoromethanesulfonates, nitrates and fluorosulfonates thereof. The polymerization is terminated by adding methanolic ammonia solution to the reaction medium to destroy or at least substantially inactivate the catalysts in question.

The preparation of PIB using heterogeneous, non-salt like catalysts is also known. For example, U.S. Pat. No. 4,288,649 describes a process for producing polyisobutene having an average molecular weight >1250 dalton by polymerizing $C_4$-hydrocarbon mixtures comprising isobutene over halided alumina catalysts. The catalysts are prepared by treating the alumina with a haliding agent, preferably with a chloriding agent, in particular with carbon tetrachloride, at an elevated temperature. A disadvantage of this process is that some of the chlorine is transferred from the catalyst to the polymer which forms. For example, the polymerization of a mixture of n-butane, isobutane and isobutene over a chlorided alumina catalyst prepared in this manner gives, after a reaction time of 2 hours, a polyisobutene product having a chlorine content of 46 ppm.

U.S. Pat. No. 5,326,920 discloses a process for polymerizing isobutene employing as heterogeneous catalyst an oxidic support material, preferably silica, which has been activated with a metal chloride attached thereto, preferably with an aluminum chloride. Particular preference is given therein to an $SiO_2$-$AlCl_2$ catalyst in which $AlCl_2$ groups are anchored on the $SiO_2$ support via oxygen linkages. The disadvantages of this process are that the polyisobutene products obtained have an extremely broad molecular weight distribution D of from 8 to 14, a low terminal double bond content and a chlorine content in the ppm range. Furthermore, this process requires the presence of promoters such as water, alcohols, alkyl halides or hydrogen chloride to achieve a catalyst activity which is sufficient for industrial operation. Similar catalyst systems for the polymerization of isobutene are described in WO 95/26815, WO 95/26816, WO 95/26814 and WO 96/26818.

JP-A 139 429/1981 utilizes heterogeneous zirconium dioxide and molybdenum oxide catalysts to prepare isobutene oligomers having a molecular weight of less than 300 dalton. These catalysts can be mixed with aluminum fluoride to increase their activity. According to this publication, for example, the reaction of an isobutene-comprising $C_4$ cut (composition: 46% of isobutene, 28% of 1-butene, 8% of 2-butenes, 12% of n-butane, 5% of isobutane, 1% of 1,3-butadiene) over an $MoO_3$—$ZrO_2$ catalyst having a molybdenum content, calculated as $MoO_3$, of 13% by weight at 120° C. yields an isobutene oligomer mixture comprising 29% of diisobutene, 49% of triisobutene and 19% of tetraisobutene.

EP-A 825 205 describes, inter alia, the continuous polymerization of pure isobutene over heterogeneous catalysts (heteropolyacids), but without giving any details about a specific reaction procedure to obtain polyisobutene having a high terminal double bond content, although its preparation is an object of said European patent application. However, the choice of the heteropolyacids as catalysts has proved to be insufficient to achieve this object.

DE-A 19 52 8942 describes the preparation of low molecular weight, reactive and halogen-free polyisobutene utilizing particular catalysts comprising a zirconium oxide support material, where it is also possible to carry out the polymerization using hydrocarbon mixtures comprising isobutene as a continuous process. It is claimed that the average molecular weight is controlled by varying the space velocity and residence time in the continuous polymerization process. However, the examples only described batchwise polymerization processes. In Examples 11–16, in which a hydrocarbon mixture comprising isobutene was used, some of the reactions were performed at low conversions and gave some high and some low selectivities for polyisobutene having an α-double bond. The use of other catalysts gave similar results according to the prior German applications DE-A 1 97 04 482 and DE-A 1 97 34 176.

EP-A 825 205 discloses a process for the polymerization of olefins in the presence of heteropolyacids. The products include polyisobutene having a high content of terminal vinylidene units. It is an object of the present invention to provide a process which makes it possible to prepare low molecular weight polyisobutene having a high a-double bond content continuously and reproducibly over a heterogeneous catalyst.

We have found that this object is achieved according to the invention by a process for preparing halogen-free, reactive polyisobutene having a terminal double bond content of more than 60 mol % and an average molecular weight $M_n$ of 800–3000 dalton by cationic polymerization in the liquid phase of isobutene over an acidic, essentially halogen-free heterogeneous catalyst, in which:

a) a hydrocarbon mixture of essentially $C_4$-hydrocarbons comprising isobutene in an amount of from 10 to 80% by weight is used as the starting material and b) polymerization is carried out continuously at from −30 to 0° C. with average starting material residence times of one hour or less, where the temperature and the residence time are selected such that the isobutene conversion is less than 60% and, after separation from the resulting polyisobutene, the isobutene is either enriched in the partially converted hydrocarbon mixture and returned to the polymerization or passed to another isobutene reaction coupled with the polymerization.

Catalysts which may be used according to the invention are in principle any acidic, essentially halogen-free catalysts capable of catalyzing isobutene polymerization at the above-described temperatures. Preference is given to catalysts based on zirconium dioxide as described in DE-A 19 52 8942, supported W and Mo oxides as described in DE-A 1 97 04 482, and heteropolyacids or salts thereof as described in DE-A 1 97 34 176 and EP-A 925 205. Particular preference is given to zirconium dioxide systems which comprise $PO_4$ and/or $SO_4$ and are furthermore doped with oxides of transition metals such as Mn, Fe (DE-A 19 52 8942), or salts of dehydrated Mo or W heteropolyacids comprising Cs.

Prior to use, the catalysts to be employed according to the invention are advantageously shaped to give shaped articles such as tablets, spheres, cylinders, rings or spirals or comminuted to give granules in a conventional manner and preferably used in this form in a fixed bed in the reactor or milled to give a powder and used in this form, for example as suspension catalysts.

The abovementioned patents essentially describe the following catalysts:

A) zirconium dioxide systems doped or promoted with elements of transition groups I–VIII or main groups II–VI of the Periodic Table of the Elements, in each case in the form of oxygen-containing compounds. Preferred promoters of transition groups of the Periodic Table of the Elements are oxygen-containing compounds of the elements Cu, Ag, Zn, Sc, Y, La, Ce, Nd, Pr, Ti, Hf, V, Nb, Ta, Mo, W, Re, Co and Ni and in particular of Mn and Fe. Preferred promoters of the main groups of the Periodic Table of the Elements are oxygen-containing compounds of the elements Ca, Mg, B, Ga, Si and Sn and in particular of the elements Al, S and P. Examples of preferred combinations of promoting elements are the combinations of S and/or P with Fe, Fe/Mn, Mn or Fe/Al. The combination of S and/or P with Mn is most preferred.

B) Heterogeneous polymerization catalysts consisting of oxides of the elements of transition groups V and VI of the Periodic Table of the Elements (unsupported catalysts) or supported oxides of the elements of transition groups V and VI of the Periodic Table of the Elements. In one embodiment, the elements of transition groups V and VI of the Periodic Table of the Elements are supported on a non-zeolitic oxidic support which is not an oxygen-containing zirconium compound. Preferred oxides of the unsupported catalysts and preferred promoters of the supported oxides are oxides of the elements V, Cr, Mo and W. Particular preference is given to oxides of molybdenum. Particularly useful support materials include the oxides of the elements B, Pb, La and especially the oxides of the elements Al, Si, Fe and Ti.

C) Heteropolyacids (in the form of unsupported or supported catalysts): preference is given to heteropolyacids having, as the "polyatom", tungsten or molybdenum, some of which may be replaced by vanadium, and having, as the central atom, silicon or preferably phosphorus. Examples of heteropolyacids comprising molybdenum in the form of their free acids are: dodecamolybdophosphoric acid ($H_3PMo_{12}O_{40}*xH_2O$); dodecamolybdosilicic acid ($H_4SiMo_{12}O_{40}*xH_2O$), dodecatungstophosphoric acid ($H_3PW_{12}O_{40}*xH_2O$) and dodecatungstosilicic acid ($H_4SiW_{12}O_{40}*xH_2O$). Preferred support materials are: activated carbon, $SiO_2$, $TiO_2$, $ZrO_2$.

D) Salts of the heteropolyacids (in the form of unsupported or supported catalysts): in the heteropolyacid salts, some or all of the hydrogen ions (protons) of the free heteropolyacids are replaced by other ions, e.g. metal ions or ammonium ions. Particularly useful systems are those in which the protons of the HPAs comprising tungsten or preferably molybdenum are replaced by ions of the elements Mn, Fe, Co, Ni, Cu, Ag, Zn, Na, K, Cs, Mg, Ca, Ba, B, Al, Bi or by ammonium ions ($NH_4^+$) or alkyl-substituted ammonium ions ($NR_4^+$). Particular preference is given to cesium salts of heteropolyacids ("HPAs") comprising tungsten and especially HPAs comprising molybdenum. Typical support materials are activated carbon, $SiO_2$, $TiO_2$ or $ZrO_2$.

The catalysts to be used according to the invention can be stored over a virtually unlimited period of time, in particular with exclusion of moisture. Catalysts which have become moist are advantageously dried under atmospheric pressure or reduced pressure, under atmospheric pressure at from 180 to 250° C. under reduced pressure also at lower temperatures, prior to use.

Typical feed materials are hydrocarbon mixtures of essentially $C_4$-hydrocarbons comprising isobutene which are obtained in large amounts e.g. in hydrocarbon cracking processes. For example, thermocracking processes (streamcracker) produce $C_4$ cuts comprising isobutene from which the butadiene is substantially removed by additional selective hydrogenation or extractive distillation using N-methylpyrrolidone. The resulting "raffinate I" is suitable for PIB synthesis and has essentially the following typical composition: 44–49% of isobutene, 24–28% of 1-butene, 19–21% of 2-butene, 6–8% of n-butane, 2–3% of isobutane (Weissermel, Arpe, "Industrielle Organische Chemie", Verlag Chemie, Weinheim, 1994, p. 76).

Alternatively, it is possible to use $C_4$ streams comprising isobutene obtained by catalytic cracking in refinery processes. This $C_4$ FCC cut (Fluid Catalytic Cracking) has the following typical composition: 15% of isobutene, 12% of 1-butene, 23% of 2-butene, 13% of n-butane, 37% of isobutane.

However, particular preference is given to using isobutene/isobutane mixtures which can be obtained from n-butane by isomerization, e.g. according to the Butamer® process (UOP), and subsequent dehydrogenation, e.g. according to the Catofin® process (Weissermel, Arpe, "Industrielle organische Chemie", Verlag Chemie, Weinheim, 1994, p. 79, 80). The dehydrogenation of isobutane according to the Catofin® process (ABB Lummus Crest) typically yields an isobutene selectivity of 92–93 mol % at an isobutane conversion of 65%. Alternative processes such as Oleflex® (UOP), STAR (Phillips), FDP (Snamprogetti/Yarsintez) operate at lower isobutane conversions (45–55%) and similarly high isobutene selectivities (87–92 mol %) (PERP report butadiene/butylenes 92-1, 1993, CHEM SYSTEMS, p. 32).

It is preferred to use isobutene-isobutane mixtures as feed materials for the synthesis of polyisobutene since the polymerization according to the invention only converts some of the isobutene and produces a halogen-free residual stream which consists virtually exclusively of $C_4$-hydrocarbons and which may be separated from the polyisobutene by distillation and used for a variety of purposes, for example:

Separation of the residual $C_4$ stream (isobutane (bp. –12° C.)/isobutene (bp. –7° C.)) by distillation into isobutane (overhead product, not necessarily free of isobutene) and a mixture of isobutane and isobutene (bottom product) equivalent to the composition of the feed and subsequent return of the bottom product to the polymerization and return of the isobutane to the dehydrogenation (preferred embodiment).

Return of the residual $C_4$ stream to the dehydrogenation

Utilization of the residual $C_4$ stream for the synthesis of methyl tert-butyl ester (MTBE).

The polymerization is carried out continuously at generally from –30 to 0° C. preferably from –25 to –10° C. under atmospheric pressure or superatmospheric pressure, especially under the autogeneous pressure of the reaction system, so that the hydrocarbon mixture comprising isobutene remains in liquid form.

Surprisingly, it has been found that when an isobutene partial conversion (up to 60%, particularly preferably up to 50% and especially up to 40%) was achieved by appropriate choice of the reaction parameters, the α-olefin contents of the PIB products were always particularly high (i.e. regularly α>60 mol %, preferably >65 mol % and especially >68 mol %).

It is possible to use conventional reactors such as loop reactors or reactor batteries in the continuous polymerization according to the invention. It is also possible to use tubular reactors or tubular reactor batteries operated in upflow or downflow mode. It is advantageous for the catalysts to be used according to the invention, preferably when using loop reactors or tubular reactors, to be arranged in a fixed bed or to be suspended in the reactor medium in powder form. Typical space velocities are from 10 kg isobutene/kg cat. *h to 0.1 kg/kg*h, preferably from 7 to 0.2 kg/kg*h, particularly preferably from 5 to 0.32 kg/kg*h. Depending on the design, typical residence times are from 0.05 to 1 h, preferably from 0.1 to 0.9 h, particularly preferably from 0.2 to 0.8 h.

The isobutene polymerization can be carried out with or without preferably apolar, halogen-free solvents, preferably hydrocarbons. Specific examples of these are butanes, pentanes, hexanes, heptanes and octanes which can be linear or branched. Particular preference is given to butanes, pentanes and hexanes. Because of the exothermic nature of the isobutene polymerization it may be advantageous to provide the reactors used with internal or external cooling means.

The desired average molecular weight $M_n$ of the polyisobutene can be adjusted by variation of the reaction parameters, in particular by variation of the temperature, residence time, amount of solvent and space velocity. The residence time is generally from 0.01 to 1 hour, preferably from 0.1 to 0.8 hour. The molecular weights $M_n$ are in the range from 800 to 3000, preferably from 1000 to 2300.

The isolation of the polyisobutene from the polymerization mixture generally does not include any special technical features and may be effected by distillation, which, if a suspended catalyst is used, is preceded by the removal of the suspended catalyst, for example by filtration, centrifugation or decanting. The distillation advantageously initially removes volatile constituents of the polymerization mixture such as unconverted isobutene, hydrocarbons present in the starting material or added as solvents and then higher-boiling byproducts, for example low molecular weight isobutene oligomers from the polyisobutene.

The process of the invention provides a particularly economical way to prepare reactive, halogen-free polyisobutene having an average molecular weight $M_n$ of generally 800–3000 dalton and a terminal double bond content of more than 60 mol %.

EXAMPLES

I. Catalyst Preparation

I.1 Catalyst A (Suspension Catalyst)

300 g of moist $Zr(OH)_4$ paste (from MEL-Chemicals, Manchester, England, having a zirconium content, calculated as $ZrO_2$, of 47% by weight) were combined with a solution of 1000 ml of distilled $H_2O$, 10.5 g of $MnSO_4 \cdot H_2O$ and 16.4 g of $(NH_4)_2SO_4$ and stirred at room temperature for 1 hour. The mixture was then evaporated on a rotary evaporator and the residue was dried at 110° C. for 5 hours and calcined at 650° C. for 3 hours. 240 g of pulverulent catalyst A were obtained which had the following composition:

Zr: 69% by weight
Mn: 0.7% by weight
S: 1.3% by weight

Analytical methods as described in DE-A 19528942.

I.2 Catalyst B (Fixed Bed Catalyst)

$ZrO_2$ paste (175 g, corresponds to about 140 g of $ZrO_2$) was suspended in an aqueous solution (500 ml) of $(NH_4)_2NO_3$ (20.6 g) and stirred at room temperature for 30 minutes. The solvent was removed and the residue was dried at 180° C. for 16 hours under atmospheric pressure. The solid was then suspended in an aqueous solution (500 ml) of $Mn(NO_3)_2 \cdot 4H_2O$ (6.6 g) and stirred at room temperature for 30 minutes. Excess water was removed and the residue (242 g) was shaped into extrudates having a diameter of 2 mm which were then dried at 110° C. overnight and calcined at 700° C. for 16 h in air. 110 g of catalyst B were obtained which had the following composition:

Zr: 69% by weight
Mn: 1.0% by weight
S: 0.9% by weight

I.3 Catalyst C (Fixed Bed Catalyst)

A suspension of 85.37 kg of $ZrO_2$ paste (corresponds to 19.63 kg of $ZrO_2$) in 50 l of deionized water were mixed with a solution of 2.11 kg of $(NH_4)_2SO_4$ in 5 kg of water followed by a solution of 1.2 kg of $Mn(NO_3)_2 \cdot 4H_2O$ in 2 kg of water and finally with 18 kg of water at room temperature with stirring. This mixture was spray-dried at 160° C. 16 kg of spray-dried powder were obtained, 4.7 kg of which were mixed with 3.87 kg of water, kneaded for 40 minutes and shaped into 3.5 mm extrudates which were then dried at 120° C. for 23 hours and calcined at 700° C. for 2 hours. 2.33 kg of catalyst C (3 mm extrudates, the balance being abraded material) were obtained which had the following composition:

Zr: 65.5% by weight
Mn: 1.3% by weight
S: 1.8% by weight

II. Polymerization of Isobutene

The number average molecular weight $M_n$ which is also referred to herein as average molecular weight $M_n$ was determined by gel permeation chromatography (GPC) using standardized polyisobutenes for calibration. The number average molecular weight $M_n$ was calculated from the resulting GPC chromatograms using the equation $$M_n = \Sigma c_i / \Sigma(c_i/M_i)$$

where ci is the concentration of the single polymer species in the resulting polymer mixture and Mi is the molecular weight of the single polymer species i. The molecular weight distribution, also called dispersity (D), was calculated from the ratio of the weight average molecular weight ($M_w$) and the number average molecular weight ($M_n$) using the equation $$D = M_w / M_n$$

where the weight average molecular weight $M_w$ was determined from the resulting GPC chromatograms using the following equation:

$$M_w = \Sigma c_i M_i / \Sigma c_i$$

The α- and β-content (formulae I and II) were determined by $^{13}C$-NMR spectroscopy. In the $^{13}C$-NMR spectrum, the carbon atoms of the terminal double bond of the α-olefins I show peaks at a chemical shift of 114.4 ppm ($CH_2$) and 143.6 ppm (C), whereas the peaks of the carbon atoms of the trisubstituted double bond of the β-olefins II are at 127.9 (=CH—R) and 135.4 ppm (=C($CH_3$)$_2$). The α- and β-olefin content can be determined by evaluation of the peak areas in comparison with the peak areas of the other olefinic C atoms. Deuterated chloroform ($CDCl_3$) was used as solvent and tetramethylsilane was used as internal standard.

Continuous fixed bed isobutene polymerization using a mixture of "raffinate I" and n-hexane as feed. Composition of "raffinate I": 43% of isobutene, 24% of 1-butene, 14% of 2-butene, 18% of butanes.

Inventive Example 1

25 g of catalyst B were predried at 180° C./0.3 mbar and then charged, in the form of 2 mm extrudates, into a tubular 25 ml reactor under argon. A mixture of "raffinate I" and n-hexane (ratio 1:1 by weight, "raffinate I") which had been dried over molecular sieve 3 A was then passed continuously through the reactor (60 g/h) at −25° C./6 bar. The space velocity was 0.5 g of isobutene/g cat. *h, and the average residence time was about 0.1 h. The reactor was operated in upflow mode with product recirculation (4 kg/h). The reaction mixture was worked up by distillation by evaporating off unconverted isobutene and the other $C_4$-hydrocarbons at room temperature and distilling off the solvent added at room temperature by slowly reducing the pressure to 0.3 mbar. The isobutene conversion was 44%. Low molecular weight isobutene oligomers were removed from the resulting polyisobutene by Kugelrohr distillation at 120° C./3 bar. The colorless polyisobutene had an average molecular weight $M_n$ of 1850, a molecular weight distribution D of 2.2 and a terminal double bond content (=α-olefin content) of 71 mol %. The α+β-olefin content was 99 mol %.

Inventive Example 2 and Comparative Examples 3 and 4

("Raffinate I"/n-hexane)

Inventive Example 2 and Comparative Examples 3 and 4 were carried out as described in Invention Example 1, but at various residence times and/or temperatures (Table 1).

TABLE 1

Continuous polymerization of isobutene over $ZrO_2$ catalyst B using a mixture of "raffinate I" and n-hexane (1:1) (fixed bed)

| Ex. | T [° C.] | Space velocity [g of iso-butene/g*h] | RT [h] | Con-version [%] | α [mol %] | α + β [mol %] | $M_n$ | D |
|---|---|---|---|---|---|---|---|---|
| Inv. 2 | −25 | 0.4 | 0.15 | 54 | 68 | 97 | 1860 | 2.1 |
| Comp. 3 | −25 | 0.3 | 0.20 | 84 | 47 | 83 | 2000 | 2.3 |
| Comp. 4 | −20 | 0.2 | 0.20 | 94 | 23 | 64 | 1330 | 2.2 |

RT: residence time
α: content of α-olefin

α+β: content of α-olefin +β-olefin

Inventive Example 5
(Continuous Isobutene Polymerization in Suspension Using a Mixture of Isobutene and isobutane as feed)

A 30 ml glass pressure vessel equipped with a liquid inlet tube and riser tube with pressure regulation means was charged with 1 g of catalyst A which had been predried at 180° C./0.3 mbar and about 20 ml of anhydrous n-hexane under argon. A mixture of isobutene and isobutane (ratio 1:3 by weight) was then continuously metered into the reactor at 44 g/h with magnetic stirring. The space velocity was 11 g of isobutene/g cat. *h, and the average residence time was about 0.4 h. The pressure was released and the reaction mixture was worked up as follows: isobutane and unconverted isobutene were evaporated at room temperature. Low molecular weight isobutene oligomers were removed from the resulting polyisobutene by Kugelrohr distillation at 120° C./0.3 bar. The PIB yield was 12%. The colorless polyisobutene had an average molecular weight $M_n$ of 880, a molecular weight distribution D of 2.5 and a terminal double bond content (=α-olefin content) of 65 mol %. The α+β-olefin content was 90 mol %.

Comparative Examples 6 and 7

Comparative Examples 6 and 7 were carried out as described in Invention Example 5, but at higher temperature, a higher residence time and an isobutene/isobutane ratio of 1:1 (see Table 2).
Table 2: Continuous Polymerization of Isobutene Over $ZrO_2$ Catalyst A Using Isobutene/Isobutane as Feed (in Suspension)

Inventive Example 8

250 g of catalyst C was granulated (1.6–2.5 mm), predried at 180° C./0.3 mbar and then charged into a tubular 250 ml reactor under an argon atmosphere. A mixture of isobutene, isobutane and n-hexane (ratio about 1:1:2 by weight, n-hexane serves as solvent) which had been dried by passing it through a drying tower containing molecular sieve 3 Å was then passed continuously through the reactor (520 g/h) at −30° C./5 bar. The space velocity was 0.52 g of isobutene/g cat.*h, and the average residence time was about 0.1 h. The reactor was operated in downflow mode with product recirculation (about 35 kg/h).

The reaction effluents were warmed to room temperature and introduced into a packed column (having 25 theoretical plates) in which isobutane and unconverted isobutene were separated from hexane and polymers (conditions: 5 bar, bottom temperature: 131° C. head temperature 39° C. reflux ratio: 1.1). This $C_4$ stream was transferred into a second column (having 80 theoretical plates) which was operated at a bottom temperature of 60° C. and a head temperature of 57° C. 8 bar and a reflux ratio of 13 and in which the isobutane was taken off overhead (95% by weight of isobutane, 5% by weight of isobutene), whereas the isobutene/isobutane mixture (48:52 by weight) obtained as the bottom product was depressurized to 5 bar and returned to the process.

The bottom product from the first column was collected. The n-hexane solvent added was distilled off at 50° C. slowly reducing the pressure to 0.3 mbar. The isobutene conversion was 55%. Low molecular weight isobutene oligomers were removed from the resulting polyisobutene by distillation using a Sambay evaporator at 220° C./5 mbar.

TABLE 2

Continuous polymerization of isobutene over $ZrO_2$ catalyst A using isobutene/isobutane as feed (in suspension)

| Ex. | Isobutene/isobutane ratio by weight | T [° C.] | Space velocity [g of isobutene/g*h] | RT [n] | Conversion [mol%] | α [mol %] | α + β $M_n$ | D |
|---|---|---|---|---|---|---|---|---|
| Comp. 6 | 1:1 | −10 | 6.5 | 1.4 | 91 | 12 | 38 | 830 | 2.9 |
| Comp. 7 | 1:1 | −10 | 5 | 1.8 | 99 | 22 | 65 | 990 | 2.9 |

RT: residence time
α: content of α-olefin

The colorless polyisobutene had an average molecular weight $M_n$ of 1050, a molecular weight distribution D of 1.8 and a terminal double bond content (α-olefin content) of 70 mol %. The α+β-olefin content was 92 mol %.

We claim:

1. A process for preparing halogen-free, reactive polyisobutene having a terminal double bond content of more than 60 mol % and an average molecular weight $M_n$ of 800–3000 Dalton by cationic polymerization in the liquid phase of isobutene over an acidic, heterogeneous catalyst, which comprises
   a) using, as starting material, a hydrocarbon mixture of essentially $C_4$-hydrocarbons comprising isobutene in an amount of from 10 to 80% by weight and
   b) continuously polymerizing at from −30 to 0° C. with average starting material residence times of one hour or less, with the proviso that
   the temperature and the residence time are selected such that the isobutene conversion is less than 60% and, after separation from the resulting polyisobutene, the isobutene is either enriched in the partially converted hydrocarbon mixture and returned to the polymerization or passed to another isobutene reaction coupled with the polymerization.

2. A process as claimed in claim 1, wherein the starting material used is a hydrocarbon mixture of essentially $C_4$-hydrocarbons predominantly comprising isobutene and isobutane and having an isobutene content of from 10 to 60% by weight.

3. A process as claimed in claim 2, wherein, in the partially converted hydrocarbon mixture, the isobutene is passed to a methyl tert-butyl ether preparation process coupled with the polymerization.

4. A process as claimed in claim 1, wherein the partially converted hydrocarbon mixture of essentially $C_4$-hydrocarbons, comprising unconverted isobutene and isobutane, is worked up by distillation, and isobutene or an isobutene-enriched fraction is returned to the polymerization stage (b) as claimed in claim 1.

5. A process as claimed in claim 2, wherein the partially converted hydrocarbon mixture, comprising unconverted isobutene and isobutane, is subjected to a dehydrogenation process and then returned to the polymerization stage.

6. A process as claimed in claim 1, wherein the heterogeneous catalyst used is selected from the group consisting of
   a) catalysts comprising one or more promoting elements from transition group I, II, III, IV, V, VI, VII or VIII of the Periodic Table of the Elements or from main group II, III, IV, V or VI of the Periodic Table of the Elements, in each case in the form of an oxygen-containing compound, and zirconium in the form of an oxygen-containing compound,
   b) catalysts consisting of one or more oxides of the elements of transition groups V and VI of the Periodic Table of the Elements or catalysts comprising one or more oxidic compounds of one or more of the elements of transition groups V and VI of the Periodic Table of the Elements supported on a non-zeolitic oxidic support material which is not an oxygen-containing zirconium compound, and
   c) heteropolyacids or salts thereof.

7. A process as claimed in claim 1, wherein the heterogeneous catalyst used is selected from the group consisting of
   a) catalysts comprising one or more promoting elements from transition group I, II, III, IV, V, VI, VII or VIII of the Periodic Table of the Elements or from main group II, III, IV, V or VI of the Periodic Table of the Elements, in each case in the form of an oxygen-containing compound, and zirconium in the form of an oxygen-containing compound, and
   b) catalysts consisting of one or more oxides of the elements of transition groups V and VI of the Periodic Table of the Elements or catalysts comprising one or more oxidic compounds of one or more of the elements of transition groups V and VI of the Periodic Table of the Elements supported on a non-zeolitic oxidic support material which is not an oxygen-containing zirconium compound.

8. A process as claimed in claim 1, wherein the heterogeneous catalyst used is a catalyst comprising one or more promoting elements from transition group I, II, III, IV, V, VI, VII or viii of the Periodic Table of the Elements or from main group II, III, IV, V or VI of the Periodic Table of the Elements, in each case in the form of an oxygen-containing compound, and zirconium in the form of an oxygen-containing compound.

9. A process as claimed in claim 1, wherein the heterogeneous catalyst used is a catalyst consisting of one or more oxides of the elements of transition groups V and VI of the Periodic Table of the Elements or catalysts comprising one or more oxidic compounds of one or more of the elements of transition groups V and VI of the Periodic Table of the Elements supported on a non-zeolitic oxidic support material which is not an oxygen-containing zirconium compound.

10. A process as claimed in claim 1, wherein the heterogeneous catalyst used is selected from the group consisting of heteropolyacids and salts thereof.

* * * * *

UNITED STATES PATENT AND TRADEMARK OFFICE
CERTIFICATE OF CORRECTION

PATENT NO. : 6,384,154 B1
DATED : May 7, 2002
INVENTOR(S) : Sigwart et al.

It is certified that error appears in the above-identified patent and that said Letters Patent is hereby corrected as shown below:

<u>Title page,</u>
Item [75], Inventors should read:
-- [75] Inventors: Christoph Sigwart, Schriesheim;
Thomas Narbeshuber, Ludwigshafen,
both of (DE); Eugen Gehrer, Rankweil, (AU);
Rolf Fischer, Heidelberg; Ulrich Steinbrenner;
Shelue Liang, both of Ludwigshafen, all of (DE) --

Signed and Sealed this

Eighth Day of October, 2002

*Attest:*

JAMES E. ROGAN
*Attesting Officer*     *Director of the United States Patent and Trademark Office*